Oct. 7, 1941.                    W. E. DUNN                    2,258,088
                    SYSTEM FOR CONDITIONING AIR FOR ENGINES
                             Filed June 15, 1940
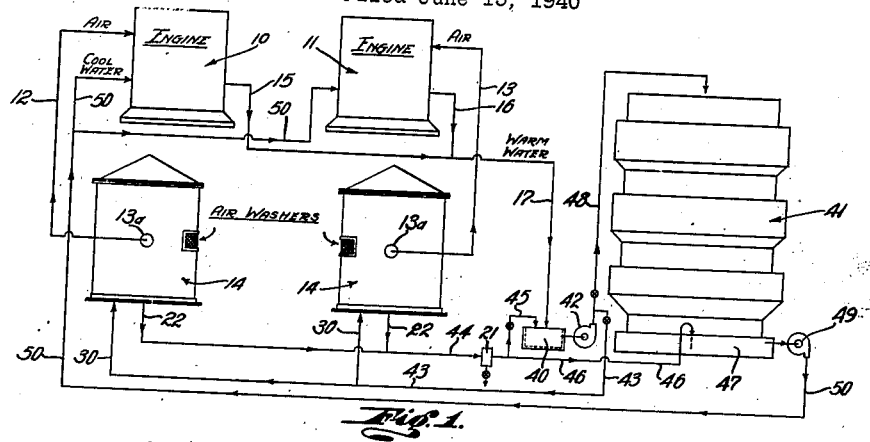
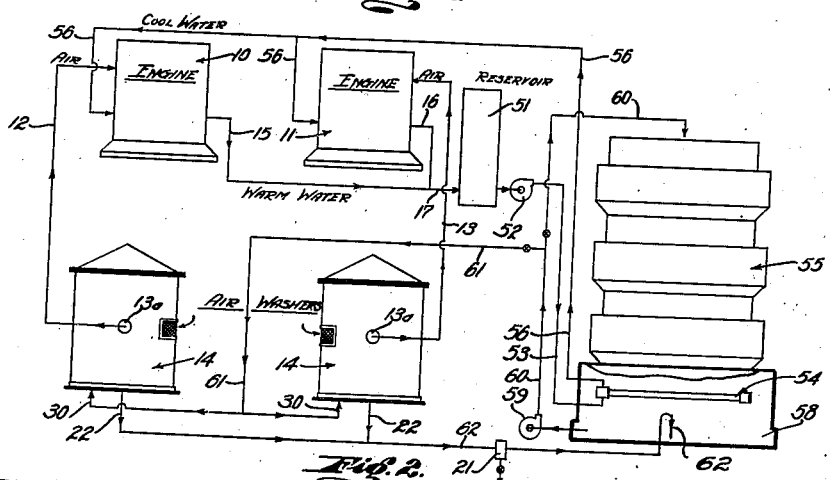
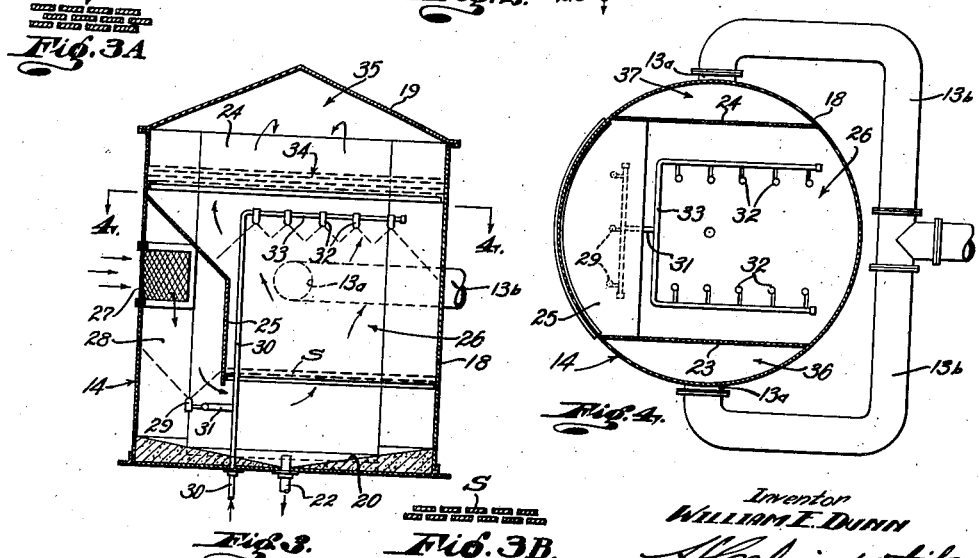
Inventor
WILLIAM E. DUNN
H. Calvin White
Attorney Patented Oct. 7, 1941

2,258,088

UNITED STATES PATENT OFFICE 2,258,088

SYSTEM FOR CONDITIONING AIR FOR ENGINES

William E. Dunn, Kansas City, Mo., assignor to The Fluor Corporation, Ltd., Los Angeles, Calif., a corporation of California Application June 15, 1940, Serial No. 340,723

9 Claims. (Cl. 123—174)

This invention relates generally to an improved system for conditioning air and cooling jacket water for the operation of internal combustion engines, particularly large heavy duty engines, singly or in batteries, for example of the type used in natural gas compressor plants.

Heretofore it has been the common and customary practice to pass the air to the engines through cleaners of various types, such as those in which the air is brought into contact with oil to free the air of dust particles. Also, ordinarily the engine jacket water is cooled in a circulatory system entirely separate and apart from the air cleaners. One of my primary objects is to provide a method whereby conditioning of the engine air and partial cooling of the jacket water are incorporated in one system, with resulting increased efficiency not only in combining the air conditioning and water cooling in one system, but also due to the improved engine operation resulting from the conditioned air being highly saturated with water vapor at all times.

In accordance with the invention, the air supply to the engine is passed or drawn through a washing zone in which the air is intimately contacted with heated water, under conditions such that the air is thoroughly washed clean and may be given a high degree of moisture saturation conducive, in general, to better engine performance. In this same operation, the engine water is subjected to cooling largely by reason of limited evaporation produced by the partial pressure effect of the relatively large quantity of air passed through the washing zone in contact with the water. Beyond the washing zone the air preferably is passed through a separating medium to remove any entrained water particles before the air flows to the engine.

For most installations of the type contemplated by the invention, the water thus initially cooled by contact with the engine supply air, is subjected to second-stage cooling in order to reduce its temperature still further and assure ample cooling capacity in the engine. Second-stage cooling preferably is effected in conjunction with a water cooling tower, either in a closed or open system, the general distinction being that in the closed system the engine cooling water is indirectly cooled by water introduced to the air washer, while in the open system, a part or all of the engine cooling water is itself subjected to limited evaporation and cooling in the air washer. Typical systems of the open and closed type can be explained to better advantage at later points in the description.

The above mentioned features and objects of the invention, as well as the details of certain typical and illustrative embodiments thereof, will be more fully understood from the description to follow. Reference is had throughout the description to the accompanying drawing in which:

Fig. 1 is a general diagrammatical illustration of the system using an open system of engine jacket water circulation;

Fig. 2 is a similar view showing a typical closed system embodying the invention;

Fig. 3 is a vertical sectional view illustrating a type of air washer adaptable for use in the system;

Figs. 3A and 3B are enlarged sectional views of the slatted decks or baffles designated respectively at S and 34 in Fig. 3; and Fig. 4 is a transverse section on line 4—4 of Fig. 3.

Referring first to the general view of Fig. 1, it will be understood that the invention is applicable to the conditioning of air and cooling of jacket water for one or any number of engines in the same system. Merely as illustrative, Figs. 1 and 2 of the drawing each shows two conventionally illustrated internal combustion engines 10 and 11 to which the washed air is drawn by the suction of the engines through lines 12 and 13 from one or more air washers 14. The heated jacket water is discharged from the engines through lines 15, 16 and 17 to be subjected to direct or indirect cooling effect of the air washers, depending upon whether an open or closed cooling system is used, all as will later appear.

The invention broadly contemplates the use of any suitable type and number of air washers, the particular form designated in 14 and shown in detail in Figs. 3 and 4, being illustrated merely for the purpose of describing a typical washer adaptable for use in the system. The novel aspects of this washer itself, comprise the subject matter of my copending application entitled Air washer, Ser. No. 340,724, filed June 15, 1940.

Referring to Figs. 3 and 4, the washer 14 comprises a vertically extending cylindric shell 18 having a suitable top closure 19 and a flat or conical bottom 20 from which water drains through line 22. A dirt separator, conventionally illustrated at 21 in Figs. 1 and 2, may be provided if desirable. The shell 18 contains a pair of spaced vertically extending walls 23 and 24 interconnected by a transverse wall 25, these walls forming within the shell a washing chamber 26 open at its top and bottom and through which an upward flow of air is maintained. Air is taken into the washer through an arcuate screened inlet 27 in the side wall of the shell opposite wall 25, the air flowing from the inlet downwardly within space 28 between wall 25 and the shell, thence reversing its flow in passing upwardly through the chamber 26. The down-flowing air in space 28 is intimately contacted with upwardly directed sprays of water discharged from nozzles 29 to which the water is delivered through pipes 30 and 31. The air stream rising within chamber 26 similarly is contacted with oppositely directed water sprays being discharged from nozzles 32 supplied with water from line 30 through a header 33. Entering the bottom of chamber 26, the air flows through a suitable apertured deck, formed for example by spaced rows of relatively offset slats S, over which the water discharged from nozzles 32 is filmed and brought into intimate and extended surface contact with the air. All dirt and dust particles in the inlet air are thoroughly wetted in chambers 28 and 26, and are carried out of the washer continuously through the water drain line 22.

Any particles of entrained water in the washed air stream leaving chamber 26 are removed by passage of the air upwardly through a suitable arrangement of baffles, generally indicated at 34 and comprising spaced rows of relatively offset slats or battens. The entrainment and dust free air passes upwardly into the space 35 below top closure 19 and then reverses its flow in passing downwardly in separate streams to the outlets 13a, through spaces 36 and 37 between shell 18 and the side walls 23 and 24 of chamber 26. As will be understood, the washed air is taken from outlets 13a and pipe 13b interconnecting them, through lines 12 and 13 to the intake manifolds of the engines. By virtue of its being sprayed in finely divided form into the air stream drawn through the washing zones, the water undergoes cooling due both to transference of heat to the air, and to a greater extent, by reason of partial evaporation with resultant cooling of the unvaporized water.

While ordinarily, a water temperature drop of at least 4° F. may be effected in the air washers alone, and while for some purposes this range of cooling may be sufficient, it is generally necessary to subject the water to further cooling by passing it through a second-stage cooling zone, and then returning the cooled water to the engines. As previously indicated, the two general methods whereby the engine jacket water may be subjected to the cooling effects of the air washers and also to what may be referred to generally as second stage cooling, are the open and closed types of cooling systems illustrated, respectively, in Figs. 1 and 2.

Referring to Fig. 1, the warm engine jacket water flowing through line 17 may be discharged into a hot well 40 which may also contain warm water from other sources, to be subjected to cooling within the cooling tower 41. As will be understood the latter may be of any suitable type, i. e. atmospheric, forced or induced draft. A portion of the water being taken from hot well 40 by pump 42 may be discharged through line 43 to the water inlet lines 30 of the air washers 14, to be contacted with the air and subjected to cooling in the washers, all as previously described. The partially cooled water discharged from the washers through lines 22 may be returned from line 44 through pipe 45 to the hot well 40, or it may be taken directly through line 46 into the collector basin 47 of the cooling tower. The water taken from the hot well by pump 42 that is not being circulated to the air washers, is elevated through pipe 48 to the top of the cooling tower and subjected to cooling in flowing downwardly through the tower into the basin 47. The necessary quantity of this water, which has been cooled by the combined effects of the air washers and cooling tower, is discharged by pump 49 through line 50 to the cooling jackets of engines 10 and 11.

In the closed type cooling system of Fig. 2 the warm engine water is discharged from line 17 into a suitable reservoir or accumulator 51, from which the water is circulated by pump 52 through line 53 to a closed cooling coil 54 within the base of the cooling tower 55. From coil 54 the water is returned to the engine jackets through line 56. Coil 54 and the engine water continuously circulating therethrough, are cooled by the cooling tower water being circulated from the base 58 to the top of the tower by pump 59 in line 60. The water cooling capacity of the air washers 14 is utilized to relieve the tower 55 of a portion of the cooling load, by circulating some of the water from line 60 through pipe 61 to the washer inlet lines 30. After cooling in the washers, the water then may be returned through line 62 to the cooling tower basin 58.

In addition to the desirability of obtaining lower temperature reduction of the engine water by two-stage cooling as described, subjecting the water to cooling in the air washers has the further advantage of reducing the load on the second cooling stage or tower, thus obviating any necessity for increasing second-stage cooling capacity where, for example, an installed system has limited capacity.

It will be understood that the drawing is to be regarded merely as illustrative of the invention in certain typical forms, and that various changes and modifications may be made without departure from the invention in its intended spirit and scope.

I claim:

1. The method of conditioning air and cooling jacket water for engine operation, that includes passing a stream of air through a washing zone to the engine, and subjecting separate streams of water to cooling by passing one stream in intimate contact with the air in said washing zone and passing the other stream through a second cooling zone, to effect cooling of the engine jacket water.

2. The method of conditioning air and cooling jacket water for engine operation, that includes passing a stream of air through a washing zone to the engine, and subjecting separate streams of water to cooling by spraying one stream of the water into said air stream in the washing zone and passing the other stream of water downwardly within a cooling tower in contact with atmospheric air, to effect cooling of the engine jacket water.

3. The method of conditioning air and cooling jacket water for engine operation, that includes passing a stream of air through a washing zone to the engine, discharging a portion only of the warm jacket water from the engine into said washing zone in intimate contact with the air stream therein, thereby cooling said portion of the water and washing the air, passing another portion of the warm jacket water from said washing zone through a second cooling zone, and then recirculating the cooled waters to the engine.

4. The method of conditioning air and cooling jacket water for engine operation, that includes passing a stream of air through a washing zone to the engine, discharging a portion only of the warm jacket water from the engine into said washing zone in intimate contact with the air stream therein, thereby cooling said portion of the water and washing the air, passing another portion of the warm jacket water from said washing zone downwardly within a second cooling zone in contact with atmospheric air passing therethrough, and then recirculating the cooled waters to the engine.

5. The method of conditioning air and cooling jacket water for engine operation, that includes drawing a stream of air through a washing zone to the engine by the engine suction, discharging warm jacket water from the engine into a reservoir, discharging a portion of the reservoir water into said washing zone in intimate contact with the air stream therein, thereby cooling said water and washing the air, passing another portion of the reservoir water downwardly within a cooling tower in contact with air passing therethrough, and then returning the cooled waters to the engine.

6. The method of conditioning air and cooling jacket water for engine operation, that includes drawing a stream of air through a washing zone to the engine by the engine suction, discharging warm jacket water from the engine into a reservoir, discharging a portion of the reservoir water into said washing zone in intimate contact with the air stream therein by spraying the water into the air stream, thereby cooling said water and washing the air, returning cooled water from said washing zone to said reservoir, passing water from the reservoir downwardly within a cooling tower in contact with air passing therethrough, and then returning the cooled waters to the engine.

7. The method of conditioning air and cooling jacket water for engine operation, that includes passing a stream of air through a washing zone to the engine, and subjecting water to cooling by intimate contact with the air in said washing zone and also by passage through a second cooling zone, and using the water thus cooled to cool a separate circulated stream of the engine jacket water.

8. The method of conditioning air and cooling jacket water for engine operation, that includes passing a stream of air through a washing zone to the engine, and subjecting water to cooling by intimate contact with the air in said washing zone and also by passage downwardly through a second cooling zone in contact with atmospheric air, and using the water thus cooled to cool a separate circulated stream of the engine jacket water.

9. The method of conditioning air and cooling jacket water for engine operation, that includes passing a stream of air through a washing zone to the engine, and subjecting water to cooling by spraying the water into said air stream in the washing zone and also by passing the water downwardly within a cooling tower in contact with atmospheric air, and using the water thus cooled to cool a separate circulated stream of the engine jacket water.

WILLIAM E. DUNN.